US012599865B2

(12) United States Patent
Olah et al.

(10) Patent No.: US 12,599,865 B2
(45) Date of Patent: Apr. 14, 2026

(54) SEALING INTERFACE, AIR DRYER CARTRIDGE AND AIR TREATMENT DEVICE

(71) Applicant: KNORR-BREMSE Systeme fuer Nutzfahrzeuge GmbH, Munich (DE)

(72) Inventors: Tibor Olah, Kecskemet (HU); Zoltan Laszlo Toth, Kiskunfelegyhaza (HU); Zoltan Tormasi, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 363 days.

(21) Appl. No.: 18/269,785

(22) PCT Filed: Dec. 27, 2021

(86) PCT No.: PCT/EP2021/087688
§ 371 (c)(1),
(2) Date: Jun. 27, 2023

(87) PCT Pub. No.: WO2022/152556
PCT Pub. Date: Jul. 21, 2022

(65) Prior Publication Data
US 2024/0066458 A1      Feb. 29, 2024

(30) Foreign Application Priority Data

Jan. 12, 2021    (EP) .................................... 21151238

(51) Int. Cl.
B01D 53/02          (2006.01)
B01D 53/04          (2006.01)
B01D 53/26          (2006.01)
(52) U.S. Cl.
CPC ....... B01D 53/0407 (2013.01); B01D 53/261 (2013.01); *B01D 2259/4566* (2013.01); *B01D 2271/02* (2013.01)

(58) Field of Classification Search
CPC ........ B01D 2259/4566; B01D 2271/02; B01D 53/0407; B01D 53/0415; B01D 53/261; B60T 17/004
See application file for complete search history.

(56) References Cited

U.S. PATENT DOCUMENTS 5,209,764 A      5/1993  Eberling
5,897,060 A      4/1999  Kon et al.
(Continued)

FOREIGN PATENT DOCUMENTS

DE          32 08 561 A1      9/1983
DE        692 10 614 T2      10/1996
(Continued)

OTHER PUBLICATIONS

International Search Report (PCT/ISA/210) issued in PCT Application No. PCT/EP2021/087688 dated Apr. 5, 2022 with English translation (2 pages).
(Continued)

*Primary Examiner* — Christopher P Jones
(74) *Attorney, Agent, or Firm* — Crowell & Moring LLP

(57)          ABSTRACT

A sealing interface for sealing between a desiccant container and a base of an air dryer cartridge for a vehicle includes a first housing structure assignable to the desiccant container, wherein at least one first sealing structure is formed by the first housing structure; a second housing structure assignable to the base of the air dryer cartridge, wherein at least one second sealing structure is formed by the second housing structure; a sealing element, especially elastic and isotropic sealing element, arranged, in a mounted state, between the first sealing structure and the second sealing structure. With regard to a longitudinal axis of the sealing interface, at least one axial sealing surface and at least one radial sealing surface for contacting the sealing element in the mounted
(Continued)

state are formed by the first sealing structure and/or the second sealing structure.

10 Claims, 1 Drawing Sheet

(56)                    References Cited

U.S. PATENT DOCUMENTS

| | | | |
|---|---|---|---|
| 5,901,464 | A | 5/1999 | Kazakis et al. |
| 5,961,698 | A | 10/1999 | Dossaji et al. |
| 8,657,939 | B2 * | 2/2014 | Eidenschink ......... B60T 17/004 |
| | | | 55/318 |
| 2007/0144350 | A1 * | 6/2007 | Paling .................. B01D 53/261 |
| | | | 96/134 |
| 2008/0289505 | A1 * | 11/2008 | Milomo ............... B01D 53/261 |
| | | | 96/134 |
| 2012/0006198 | A1 | 1/2012 | Honjo |
| 2012/0118157 | A1 | 5/2012 | Eidenschink et al. |
| 2013/0036912 | A1 | 2/2013 | Clair et al. |
| 2013/0087046 | A1 * | 4/2013 | Aumueller ......... B01D 53/0415 |
| | | | 96/118 |
| 2013/0206003 | A1 * | 8/2013 | Hilberer ............. B01D 53/0415 |
| | | | 96/108 |
| 2014/0260995 | A1 * | 9/2014 | Adams ............... B01D 46/0039 |
| | | | 96/400 |
| 2017/0106335 | A1 | 4/2017 | Kaupert et al. |
| 2018/0236398 | A1 * | 8/2018 | Heer .................. B01D 53/0415 |
| 2020/0180583 | A1 * | 6/2020 | Carritte ................ B60T 17/004 |
| 2021/0270371 | A1 * | 9/2021 | Leinung ................ F16J 15/061 |

FOREIGN PATENT DOCUMENTS

| | | |
|---|---|---|
| DE | 10 2015 112 488 A1 | 2/2017 |
| EP | 0 933 117 A1 | 8/1999 |
| KR | 1998-701288 A | 5/1998 |
| KR | 10-2019-0067248 A | 6/2019 |
| RU | 2307969 C1 | 10/2007 |
| RU | 2335680 C1 | 10/2008 |
| RU | 2628024 C2 | 8/2017 |
| RU | 2721336 C2 | 5/2020 |
| SU | 1161758 A1 | 6/1985 |
| SU | 1348592 A1 | 10/1987 |
| SU | 1767256 A1 | 10/1992 |
| WO | WO 2011/000766 A1 | 1/2011 |

OTHER PUBLICATIONS

Written Opinion (PCT/ISA/237) issued in PCT Application No. PCT/EP2021/087688 dated Apr. 5, 2022 (8 pages).
Extended European Search Report issued in European Application No. 21151238.9 dated Jul. 9, 2021 (10 pages).
Cover page of EP 2 448 801 A1 published May 9, 2012 (1 page).
Russian-language Office Action issued in Russian Application No. 2023120969/05(045833) dated Dec. 12, 2023 with partial English translation (10 pages).
Korean-language Office Action issued in Korean Application No. 10-2023-7027292 dated Sep. 5, 2025, with English translation (17 pages).
Chinese-language Office Action issued in Chinese Application No. 202180090353.3 dated Sep. 13, 2025, with English translation (14 pages).

* cited by examiner

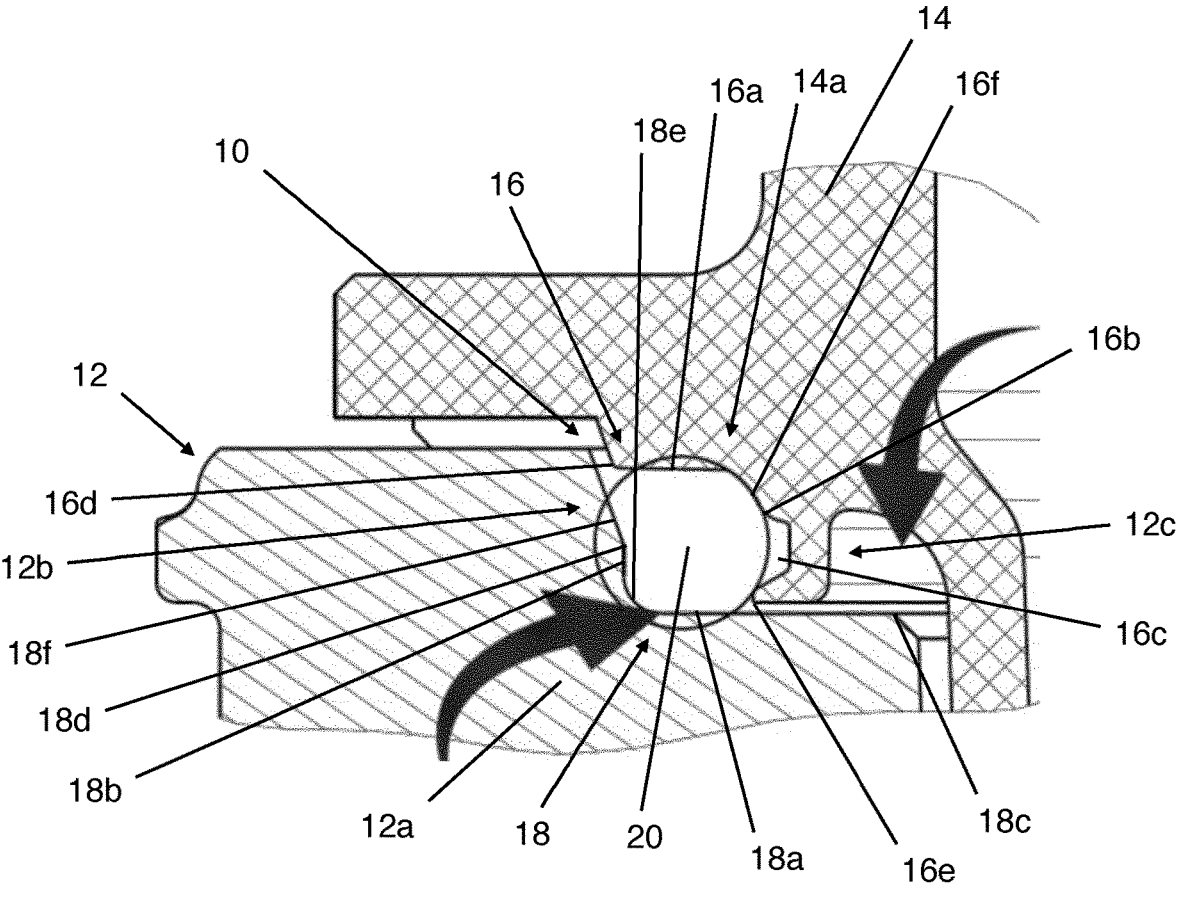

SEALING INTERFACE, AIR DRYER CARTRIDGE AND AIR TREATMENT DEVICE

BACKGROUND AND SUMMARY

The present invention relates to a sealing interface for sealing between at least one desiccant container and at least one base of an air dryer cartridge for a vehicle, especially a utility vehicle, with at least one first housing structure; with at least one second housing structure; and with at least one sealing element.

Further, the present invention relates to an air dryer cartridge for an air treatment device for a vehicle, especially a utility vehicle, with at least one sealing interface as mentioned above. Additionally, the present intention relates to an air treatment device for a vehicle, especially a utility vehicle, with at least one air dryer cartridge as mentioned above.

In the field of vehicles and especially utility or commercial vehicles, usually pneumatic systems are used for brakes, suspension and other auxiliary systems, wherein the distribution of the air is handled by a multi-circuit protection valve that can divide the air provided by a compressor or the like, and handles the different opening and closing pressures, the pressure limitation of each circuits, and the circuit protection.

Before the pressurized air may be controlled this way, an important measure is to dry this air (as it still contains humidity of the atmosphere) provided by the compressor. This drying procedure is established by an air dryer cartridge being arranged between the compressor and the multi-circuit protection valve such that dried and de-oiled air is provided to the multi-circuit protection valve.

Such conventional air dryer cartridges are already known in the prior art.

DE 3208561 A1 shows an air-drying device having a connection housing on which a cap-shaped container is mounted, which accommodates a drying agent cartridge. For ease of changing the drying agent cartridge, a clamping bracket is used, which is swivellably mounted on the housing and can be swivelled over the container and fixed there.

DE 69210614 T2 discloses an air dryer control system in which the compressed air output of a compressor is dried by one of two air dryers connected in parallel. The purging and drying cycles of the air dryers are alternated by a timing and relay device.

EP 0933117 A1 discloses a shuttle valve for a gas drying system that cleans and dries a stream of unpurified pressurized gas received from a source thereof and supplied to a pneumatic system that uses such a purified pressurized air. The valve includes a housing that connects a drying assembly to a structure that conveys the unpurified pressurized air to the drying assembly.

EP 2448801 A1 shows an air dryer cartridge for a compressed air treatment system of a vehicle, in particular of a commercial vehicle, comprising a spring cover and a carrier element, which together define a volume of the air dryer cartridge in the assembled state of the air dryer cartridge, wherein a desiccant box arranged inside the volume and filled with a desiccant is provided.

U.S. Pat. No. 5,901,464 A relates to a twin tower air drying system for cleaning and drying a stream of unpurified pressurized air including a centrifugal separator having a baffle horizontally disposed therein to generally separate the centrifugal chamber into an upper sub-chamber and a lower sub-chamber; a pair of cavities each containing desiccant media and a purge tube with a flapper valve thereover to close and restrict flow of air through the purge tube when air is flowing upwardly through the cavity, and to open and promote air flow through the purge tube when air is flowing downwardly through the cavity.

U.S. Pat. No. 5,961,698 A discloses a twin tower gas drying system for cleaning and drying a stream of unpurified pressurized gas received from a source thereof for use of a pneumatic system. The drying system includes a manifold block provided with the plurality of ports. A separator and sump are connected to such a block and to one of the ports for initially separating moisture and particulates from such stream of unpurified gas, and for directing the remainder of the stream to the one port in the block.

Basically, the sealing between the desiccant container and the air dryer cartridge accommodating the desiccant container, according to the prior art, is solved by many different sealing elements. One major aspect of the interaction between the desiccant container and the air dryer cartridge is the relative axial movement, even in the finally mounted state, due to different operation conditions of the utility vehicle and the cartridge such as vibrations, temperature differences, humidity and the necessity of pretension the desiccant inside the desiccant container. Thus, a large number of components and construction space together with unintentional sealing issues occur.

It is therefore an object of the present invention to improve a sealing interface and an air dryer cartridge as mentioned above, in particular in that they are simplified in structural and functional terms, a better sealing performance is provided, and the sealing interface and the air dryer cartridge are easy to mount.

This object is solved according to the present invention with a sealing interface according to the independent claims. Correspondingly, a sealing interface for sealing between at least one desiccant container and at least one base of an air dryer cartridge for a vehicle, especially utility vehicle, is provided with at least one first housing structure assignable to the desiccant container, wherein at least one first sealing structure is formed by the first housing structure; with at least one second housing structure assignable to the base of the air dryer cartridge, wherein at least one second sealing structure is formed by the second housing structure; and with at least one sealing element, especially elastic and isotropic sealing element, being arranged, in a mounted state, between the first sealing structure and the second sealing structure, wherein, with regard to a longitudinal axis of the sealing interface, at least one axial sealing surface and at least one radial sealing surface for contacting the sealing element in the mounted state are formed by the first sealing structure and/or the second sealing structure.

The invention is based on the basic idea that the sealing interface provides at least one radial sealing surface and at least one axial sealing surface with regard to the longitudinal axis of the sealing interface. This setup enables an increased overall sealing contact area for the sealing element resulting first in an increased sealing performance. Second, the surface pressure of the sealing element may specifically be decreased due to the higher sealing contact area resulting in a lower material wear and strain together with a higher lifetime and a better pretension performance of the sealing element. In this regard, the sealing element may be formed by an elastomeric or rubber material and by an isotropic sealing material such that the axial compensation between the desiccant container and the cartridge may be established in every direction in space according to an efficient manner. Especially, the sealing element may be formed as a single sealing element.

Accordingly, the sealing element is formed by at least one circular sealing ring. Circular sealing rings like O-rings have been known for many decades as very reliable, cheap and efficient sealing solutions. Also, O-rings provide very easy and fast mounting solutions. In this regard, O-rings, due to their isotropic and elastomeric material, provide a structurally very simple solution of sealing the first and second housing structures in an axial as well as a radial fashion. The isotropic and elastomeric material may be formed as rubber for example. It is also contemplated that the sealing element alternatively or additionally is formed by at least one other shaped sealing ring. The sealing ring may be shaped as at least one circular k-ring, delta-ring, v-ring, quad-ring, gamma-ring, wedge ring, sealing lens ring, flat sealing ring, molded sealing ring and/or lip sealing ring etc.

Also, the at least one axial sealing surface and/or the at least one radial sealing surface comprise or comprises at least one sealing groove. According to the invention, the provision of the sealing groove within at least one sealing surface is closely linked to the isotropic and elastomeric material properties of the sealing element. Therefore, the sealing element, in the mounted state of the sealing interface, is usually mounted in a pretensioned manner between the at least one axial sealing surface and the at least one radial sealing surface resulting in a pretensioned contact between the sealing element and the sealing surfaces, respectively. As the sealing groove is further provided therein, and due to the pretensioned state of the sealing element and its isotropic and elastomeric properties, the sealing element also extends into the sealing groove according to a predetermined manner and a predetermined sealing volume. This is dependent of several pretension parameters (such as geometries, materials, surface roughness, rubber elasticity, and the pretension forces of the desiccant container and its first housing structure). If the pretension of the sealing element changes (what is actually the case due to different operation parameters such as vibrations, temperature differences and the necessity of pretension the desiccant inside the desiccant container), the sealing element may react to this change due to its elastic and isotropic properties. When the pretension of the desiccant container is decreased, which normally results an increased distance between the sealing surfaces a decreased pretension of the sealing element, the predetermined volume of the sealing element inside the sealing groove decreases as the sealing element has to compensate the rising distances of the sealing surfaces. According to a contrary behaviour of the desiccant container, i.e. when the pretension of the desiccant container is increased, which normally results a decreased distance between the sealing surfaces and the increased pretension of the sealing element, then the predetermined volume of the sealing element extending inside the sealing groove increases again as the sealing element has to compensate the lowering distances of the sealing surfaces accordingly. In other words, the sealing groove provides a compensation or reservoir volume for the sealing element in order to compensate the changing distances of the sealing surfaces, which differ during the normal and intentional operation of the sealing interface.

Moreover, with regard to the longitudinal axis of the sealing interface, at least one first axial sealing surface and at least one first radial sealing surface for contacting the sealing element are formed by the first sealing structure. As the provision of the at least one first axial sealing surface and the at least one first radial sealing surface increase the overall sealing surface, a higher sealing performance together with a decreased surface pressure of the sealing element occurs. Thus, an elongated lifetime together with and increased sealing performance and sealing security may be provided.

Further, with regard to the longitudinal axis of the sealing interface, at least one second axial sealing surface and at least one second radial sealing surface for contacting the sealing element are formed by the second sealing structure. According to the arguments of the first sealing structure, the at least one second axial sealing surface and the at least one second radial sealing surface further increase the sealing surface, which results in an even higher sealing performance together with a decreased surface pressure of the sealing element occurs. Thus, an even elongated lifetime together with and increased sealing performance and sealing security may be provided.

Additionally, the first axial sealing surface and/or the second axial sealing surface comprise or comprises at least one sealing groove. As mentioned above, the sealing groove together with the elastic and isotropic material properties of the sealing element may compensate the continuously changing pretension conditions especially of the desiccant container with regard to the air dryer cartridge. As the pretension conditions of the desiccant container especially change in an axial direction (according to a longitudinal axis of the sealing interface), an axial sealing surface with a corresponding sealing groove is advantageous in this matter accordingly.

In addition, the first radial sealing surface and/or the second radial sealing surface comprise or comprises at least one sealing groove. As mentioned above, the sealing groove together with the elastic and isotropic sealing element may compensate the continuously changing pretension conditions especially of the desiccant container. As mentioned above, the pretension conditions of the desiccant container especially change in an axial direction (according to a longitudinal axis of the sealing interface). But, the sealing element has isotropic elastic properties such that a radial sealing surface with a corresponding sealing groove is also advantageous in this matter since the sealing element may compensate or convert axial movements into a radial extension within the sealing groove as well due to its isotropic properties.

Especially, the sealing element, in the mounted state, is arranged such that at least one axial movement of the first housing structure with regard to the second housing structure or vice versa may be compensated. As mentioned above, the sealing interface is exposed to several pretension conditions (e.g. the pretension of the desiccant container and its first housing structure with regard to the base of the air dryer cartridge). If the pretension of the sealing element changes due to normal operation of the cartridge, the sealing element may react to this change as mentioned above. Thus, this structural and functional configuration is advantageous in terms of a more reliable operation of the sealing interface together with the desiccant container and the air dryer cartridge.

Furthermore, the sealing element, in the mounted state, is arranged such that the first housing structure together with its assignable desiccant container may be pretensioned against the second housing structure together with its assignable base of the air dryer cartridge. In this configuration, the elastic sealing element serves, beside its sealing function, like a rubber spring according to a pretension device for the whole desiccant container and the air dryer cartridge. Therefore, a construction space saving design may be established since the sealing element takes over at least two functions (sealing and pretension) in one element such that a very efficient sealing interface and air dryer cartridge may be provided.

Besides, according to the invention, an air dryer cartridge for an air treatment device for a vehicle, especially utility vehicle; with at least one desiccant container comprising at least one first housing structure; with at least one base comprising at least one second housing structure for supporting the desiccant container; and with at least one sealing interface as mentioned above. The advantages and technical teachings as discussed above with regard to the sealing interface, which is a sub-unit of the air dryer cartridge, are also transferable to the air dryer cartridge accordingly.

According to the invention, an air treatment device for a vehicle, especially utility vehicle, is further provided with at least one air dryer cartridge as mentioned above. The advantages and technical teachings as discussed above with regard to the sealing interface and the air dryer cartridge, which are sub-units of the air treatment device, are also transferable to the air treatment device accordingly.

Further details and advantages of the present invention shall now be disclosed in an embodiment according to the invention in connection with the drawing.

BRIEF DESCRIPTION OF THE DRAWING

FIG. 1 is a schematic partial and sectional view of an embodiment of a sealing interface according to the invention for an air dryer cartridge of a vehicle.

DETAILED DESCRIPTION OF THE DRAWING

FIG. 1 shows a schematic partial and sectional view of an embodiment of a sealing interface 10 for an air dryer cartridge 12 of a utility vehicle (not shown).

The sealing interface 10 for sealing between a desiccant container 14 and a base 12a of the air dryer cartridge 12 for an utility vehicle comprises a first housing structure 14a.

This first housing structure 14a is assigned or assignable to the desiccant container 14.

Especially, the first housing structure 14a is integrally attached or attachable to the desiccant container 14 at a bottom portion of the desiccant container 14.

The first housing structure 14a and the desiccant container 14 are formed by a plastic material.

Additionally, the first housing structure 14a forms a first sealing structure 16.

Accordingly, the sealing interface 10 comprises a second housing structure 12b that is assigned or assignable to the base 12a of the air dryer cartridge 12.

Especially, the second housing structure 12b is integrally attached or attachable to the base 12a of the air dryer cartridge 12.

The second housing structure 12b and the base 12a are formed by an aluminium alloy.

Accordingly, the second housing structure 12b forms a second sealing structure 18.

The sealing interface 10 further comprises a sealing element 20 in the form of an elastic and isotropic sealing element.

The sealing element 20 is arranged, in a mounted state of the sealing interface 10, between the first sealing structure 16 and the second sealing structure 18 in a pretensioned manner.

The sealing element 20 is formed by a circular sealing ring like an O-ring comprising a circular cross-section in a state where this O-Ring is not pre-tensioned.

Alternatively or additionally, the sealing ring may be shaped as at least one circular k-ring, delta-ring, v-ring, u-ring, quad-ring, gamma-ring, grooved ring, wedge ring, sealing lens ring, flat sealing ring, molded sealing ring, membrane ring or lip sealing ring etc.

Alternatively or additionally, the sealing ring may be combined separately or integrally with a supporting ring.

The sealing interface 10 further comprises at least one axial sealing surface 16a, 18a and at least one radial sealing surface 16b, 18b, with regard to a longitudinal axis of the sealing interface (not shown in FIG. 1), for contacting the sealing element 20.

The at least one axial sealing surface 16a, 18a and the at least one radial sealing surface 16b, 18b are formed by the first sealing structure 16 and the second sealing structure 18, respectively.

Specifically, according to FIG. 1, a first axial sealing surface 16a and a first radial sealing surface 16b, with regard to the longitudinal axis of the sealing interface, both for contacting the sealing element 20 are formed by the first sealing structure 16.

Accordingly, a second axial sealing surface 18a and a second radial sealing surface 18b, with regard to the longitudinal axis of the sealing interface, for contacting the sealing element 20 are formed by the second sealing structure 18.

As can be further seen in FIG. 1, the first radial sealing surface 16b comprises a sealing groove 16c.

Alternatively or additionally, it is also contemplated that the first axial sealing surface 16a comprises a sealing groove (not shown in FIG. 1).

Alternatively or additionally, it is also contemplated that the second axial sealing surface 18a comprises a sealing groove (not shown in FIG. 1).

Alternatively or additionally, it is also contemplated that the second radial sealing surface 18b comprises a sealing groove (not shown in FIG. 1).

The first axial sealing surface 16a is formed by a ring-shaped surface formed at an axial protrusion of the first housing structure 14a at a base portion of the desiccant container 14.

The first axial sealing surface 16a has a free radial outer end 16d according to the mounded state.

The first axial sealing surface 16a is perpendicularly aligned with regard to the longitudinal axis of the sealing interface 10.

The first radial sealing surface 16b is also formed by a ring-shaped sealing surface having a free axial lower end 16e according to the mounded state.

The first radial sealing surface 16b is concentrically aligned with regard to the longitudinal axis of the sealing interface 10.

The first axial sealing surface 16a and first radial sealing surface 16b are connected to each other via a first transition sealing surface 16f that is formed by a quarter circle shape.

The first axial sealing surface 16a is arranged radially outside with regard to the first radial sealing surface 16b according to the mounted state.

Additionally, the first radial sealing surface 16b is arranged axially below the first axial sealing surface 16a according to the mounted state.

Additionally, the first radial sealing surface 16b comprises the sealing groove 16c that is formed by a circular ring-shaped groove in the first radial sealing surface 16b.

The sealing groove 16c has an open side facing the sealing element 20 in the mounted state.

The first radial sealing surface 16b together with the sealing groove 16c are formed by a ring-shaped protrusion axially and integrally protruding from the first housing structure 14a at the base portion of the desiccant container 14.

The second axial sealing surface 18a is also formed by a ring-shaped surface that is formed at a bottom of a ring-shaped recess 12c of the second housing structure 12b of the base 12a.

The second axial sealing surface 18a has a free radial inner end 18c according to the mounded state.

The second axial sealing surface 18a is perpendicularly aligned with regard to the longitudinal axis (not shown in FIG. 1) of the sealing interface 10.

The second radial sealing surface 18b is also formed by a ring-shaped surface having an upper axial end 18d according to the mounded state.

The second radial sealing surface 18b is concentrically aligned with regard to the longitudinal axis of the sealing interface 10.

The second axial sealing surface 18a and the second radial sealing surface 18b are connected to each other via a second transition sealing surface 18e that is formed by a quarter circle shape.

The second axial sealing surface 18a is arranged radially inside with regard to the second radial sealing surface 18b according to the mounted state.

Additionally, the second radial sealing surface 18b is arranged axially above the second axial sealing surface 18a according to the mounted state.

Additionally, the second radial sealing surface 18b, at its upper axial end 18d, merges into an inclined sealing surface 18f that is inclined radially outwards with regard to the second radial sealing surface 18b.

According to the mounted stage, the first axial and the first radial sealing surface 16a, 16b are axially and radially arranged inside the geometrical extension of the ring-shaped groove 12c of the second housing structure 12b that forms the structural basis of the second axial and radial sealing surface 18a, 18b.

As can be further seen in FIG. 1, an air dryer cartridge 12 for an air treatment device for a utility vehicle (both not shown) is partly shown according to a sectional view.

The air dryer cartridge 12 comprises a desiccant container 14 with a first housing structure 14a that corresponds to that first housing structure 14a as mentioned above in connection with the sealing interface 10.

The air dryer cartridge 12 further comprises base 12a for supporting the desiccant container 14, wherein the base 12a comprises the second housing structure 12b as mentioned above in connection with the sealing interface 10.

Accordingly, the air dryer cartridge 12, in the mounted state, further comprises the sealing interface 10 as mentioned above.

The advantages and technical teachings as discussed above with regard to the sealing interface 10, which is a sub-unit of the air dryer cartridge 12, are also transferable to the air dryer cartridge 12 accordingly.

According to the invention, an air treatment device for a utility vehicle (both not shown) is further provided with at least one air dryer cartridge 12 as mentioned above.

Accordingly, the advantages and technical teachings as discussed above and with regard to the sealing interface 10 and the air dryer cartridge 12, which are sub-units of the air treatment device, are also transferable to the air treatment device accordingly.

The function of the inventive sealing interface 10 together with the air dryer cartridge 12 is as follows:

According to FIG. 1, the sealing interface 10 is depicted in the mounted state.

As the desiccant container 14 is mounted in a pre-tensioned manner inside the air dryer cartridge 12, the first housing structure 14a of the desiccant container 14 is at least axially movable with regard to the second housing structure 12b of the base 12a of the air dryer cartridge 12.

Also, the sealing element 20 in the form of an O-ring is mounted in a pre-tensioned manner staying in the pre-tensioned contact with the first radial and axial sealing surfaces 16a, 16b and with the second radial and axial sealing surfaces 18a, 18b of the sealing interface 10.

As the sealing groove 16c is further provided (see explanations above), and due to the pretensioned state of the sealing element 20 and its isotropic and elastomeric properties, the sealing element 20 also extends into the sealing groove according to a predetermined volume.

This is dependent on several pretension parameters (such as geometries, materials, surface roughness, rubber elasticity, and the pretension forces of the desiccant container and its first housing structure).

Consequently, if the pretension of the desiccant container 14 and its first housing structure 14 changes, the axial distance between the first and second housing structures 12b, 14a slightly changes in a predetermined manner.

Therefore, the sealing element 20, in the mounted state, is arranged such that an axial movement of the first housing structure 14a with regard to the second housing structure 12b or vice versa may be compensated.

Thus, when the pretension of the desiccant container 14 is decreased for example as explained above, then the predetermined volume of the sealing element 20 extending inside the sealing groove 16c decreases as the sealing element has to compensate the rising axial distances between both axial sealing surfaces 16a, 18a.

According to a contrary behaviour of the desiccant container 14, i.e. when the pretension of the desiccant container 14 is increased, which normally results a decreased distance between the axial sealing surfaces 16a, 18a and an increased pretension of the sealing element, then the predetermined volume of the sealing element 20 extending inside the sealing groove 16c increases again as the sealing element has to compensate the lowering distances between both axial sealing surfaces 16a, 18a accordingly.

In other words, the sealing groove 16c provides a compensation or reservoir volume for the sealing element 20 in order to compensate the different distances of the axial sealing surfaces 16a, 18a, which differ during the normal and intentional operation of the sealing interface 10 and the air dryer cartridge 12.

This behaviour as discussed above with regard to axially changing distances between the first and second axial sealing surfaces 16a, 18a, are also transferrable according to the radially changing distances between the first and second radial sealing surfaces 16a, 18a.

The pretension of the desiccant container 14 may be established by a pretension spring (not shown).

Additionally, the sealing element 20, in the mounted state, is arranged such that the first housing structure 14a with its assigned desiccant container 14 may be pretensioned with regard to the second housing structure 12b with its assigned base 12a of the air dryer cartridge 12.

This combined functional behaviour of the sealing element 20 results in an improved sealing behaviour as the sealing interface 10 in general and the sealing element 20 specifically may adapt and compensate every pretension state of the desiccant container 14 within predetermined boarders.

The arrows and/or arrow parts that are not associated with a reference sign do not have any contribution to the subject-matter of the sealing interface 10, the air dryer cartridge 12 and the air treatment device according to the present invention, respectively.

REFERENCE SIGNS

10 sealing interface
12 air dryer cartridge
12a base
12b second housing structure
12c ring-shaped recess
14 desiccant container
14a first housing structure
16 first sealing structure
16a first axial sealing surface
16b first radial sealing surface
16c sealing groove
16d free radial outer end
16e free axial lower end
16f first transition sealing surface
18 second sealing structure
18a second axial sealing surface
18b second radial sealing surface
18c free radial inner end
18d upper axial end
18e second transition sealing surface
18f inclined sealing surface
20 sealing element

The invention claimed is:

1. An air dryer cartridge for an air treatment device of a vehicle, comprising:

at least one desiccant container having at least one first housing structure with at least one base and at least one second housing structure configured to support the at least one desiccant container;

at least one sealing interface formed between the at least one desiccant container and the at least one base, and being configured to seal between the at least one desiccant container and the at least one base;

wherein at least one second sealing structure is formed by the second housing structure; and a sealing element being arranged, in a mounted state, between the first sealing structure and the second sealing structure, wherein, with regard to a longitudinal axis of the sealing interface, at least one axial sealing surface and at least one radial sealing surface for contacting the sealing element in the mounted state are formed by the first sealing structure and/or the second sealing structure, and the at least one axial sealing surface and/or the at least one radial sealing surface comprise at least one sealing groove, the at least one sealing groove provides compensation or reservoir volume for the sealing element in order to compensate changing distances of the at least one axial sealing surface and of the at least one radial sealing surface, which differ during normal and intentional operation of the at least one sealing interface.

2. The air dryer cartridge according to claim 1, wherein the sealing element is an elastic and isotropic sealing element.

3. The air dryer cartridge according to claim 1, wherein the sealing element is formed by at least one circular sealing ring.

4. The air dryer cartridge according to claim 1, wherein with regard to the longitudinal axis of the sealing interface, at least one first axial sealing surface and at least one first radial sealing surface for contacting the sealing element are formed by the first sealing structure.

5. The air dryer cartridge according to claim 4, wherein with regard to the longitudinal axis of the sealing interface, at least one second axial sealing surface and at least one second radial sealing surface for contacting the sealing element are formed by the second sealing structure.

6. The air dryer cartridge according to claim 5, wherein the first axial sealing surface and/or the second axial sealing surface comprise or comprises at least one sealing groove.

7. The air dryer according to claim 5, wherein the first radial sealing surface and/or the second radial sealing surface comprise or comprises at least one sealing groove.

8. The air dryer cartridge according to claim 1, wherein the sealing element, in the mounted state, is arranged such that at least one axial movement of the first housing structure with regard to the second housing structure, or vice versa, may be compensated.

9. The air dryer cartridge according to claim 1, wherein the sealing element, in the mounted state, is arranged such that the first housing structure is attached to the at least one desiccant container are pretensionable against the second housing structure together with the at least one base of the air dryer cartridge.

10. An air treatment device for a utility vehicle comprising the an air dryer cartridge according to claim 1.

* * * * *